United States Patent [19]

Gartside

[11] Patent Number: 4,693,322

[45] Date of Patent: Sep. 15, 1987

[54] PNEUMATIC HAMMER

[75] Inventor: Roger H. Gartside, Glenshaw, Pa.

[73] Assignee: The Pannier Corporation, Pittsburgh, Pa.

[21] Appl. No.: 786,030

[22] Filed: Oct. 10, 1985

[51] Int. Cl.[4] .......... B23B 45/16

[52] U.S. Cl. .......... 173/116; 173/13; 173/134; 173/132; 164/229; 91/216 K

[58] Field of Search .......... 173/13-17, 173/101, 103, 116, 134, 128, 132; 164/229; 91/217, 216 K; 92/117 A; 29/DIG. 37

[56] References Cited

U.S. PATENT DOCUMENTS

| | | | |
|---|---|---|---|
| 691,442 | 1/1902 | Carroll | 164/229 X |
| 3,094,186 | 7/1963 | Ballash | 173/103 X |
| 3,185,223 | 5/1965 | Uhl | 91/216 R |
| 3,393,755 | 7/1968 | Glaser et al. | 173/116 |

*Primary Examiner*—E. R. Kazenske
*Assistant Examiner*—William Fridie, Jr.
*Attorney, Agent, or Firm*—Robert D. Yeager; George D. Dickos

[57] ABSTRACT

Apparatus for pneumatically stamping identifying impressions on a workpiece is provided. The apparatus includes a double-acting air cylinder having a hollow piston rod. An impact piston is provided inside the barrel formed inside the piston rod to, alternatively, seal an aperture in the piston or to travel inside the barrel in order to strike a plunger mounted in a plunger housing slidably supported by the leading end of the piston rod. A stamping head having an anvil adjacent to the stamping characters is provided to be mounted on the end of the plunger housing. In operation, compressed air is injected behind the piston rod thereby extending it toward the workpiece while compressed air is provided ahead of the impact piston to retain it in seated position on an aperture in the piston of the piston rod. When the stamping characters engage the workpiece, further advancement of the piston rod closes the source of compressed air ahead of the impact piston and opens venting apertures.

7 Claims, 8 Drawing Figures

PNEUMATIC HAMMER

BACKGROUND OF THE INVENTION

1. Field of the Invention

The present invention relates to pneumatic stamping devices and, in particular, to an apparatus which is pneumatically operated and effective to approach and stamp a hot metallic object with an identifying impression.

2. Description of the Prior Art

A perenninal problem attendant in various industries is the individual identification of objects. Such objects may include metals or wood products and may be of a large physical size. An example of the types of concerns involved with the identification of such objects arises in relation to the steel industry. In that environment, some means must be provided for the indentification of large steel products such as billets, blooms, slabs or the like. The practice of stamping identifying markings into the surface of such objects to a depth of 0.015 to 0.030 inches has developed in response to those needs. While the stamping of identifying information on such objects is feasible, it will be readily appreciated that it is advantageous to stamp the material immediately after forming and, therefore, while very hot, due to the reduced strength of the steel while at an elevated temperature. However, due to the extreme temperature of the steel immediately after it has undergone forming operations, it is dangerous and impractical for a worker to approach the steel to manually stamp the identifying information thereon.

For this reason, mechanized devices for accomplishing the stamping of materials such as steel billets have been developed. However, for various reasons, including those set forth hereinbelow, all previous identification stamping mechanisms have serious problems associated therewith which have heretofore been unsolvable.

One example of a prior art stamping apparatus which is fairly indicative of the state of the art includes a piston which is free moving within a cylinder. Upon activation of a trigger rod which controls a valve means, the piston is propelled along the cylinder by means of compressed air and is caused to indirectly strike type characters which, in turn, strike the object to be marked leaving identifying symbols idented thereon.

In particular, an early generation model of such a stamping device included a source of compressed air in communication with the cylinder in the area behind the piston. The introduction of the compressed air behind the piston was controlled by a complicated valve means which provided a tortuous route for the air to traverse which valve means included the extended trigger rod which extended to the leading end of the cylinder. Mounted on the front end of the cylinder was a slidable housing which accepted a plunger in engagement with an anvil. A cartridge containing the type characters was supported by the housing at the leading end thereof. A support which enabled the manual displacement of the device into proximity with the object to the stamped, such as a jib or a track configuration, was also provided.

To utilize such a stamping device it was manually swung or pushed into contact with the object to be marked. Such contact would displace the slidable housing into contact with the elongated trigger rod. The displacement of the trigger rod would cause the actuation of the valve means which would allow compressed air to pass through the valve means and enter the cylinder behind the piston. The piston would then be driven along the length of the cylinder and strike the plunger thereby, respectively, driving the plunger into the anvil, and the type mounted in the cartridge into the object.

As is known by those skilled in the art, such a device as described immediately above suffered from a host of serious problems. First, by the manual thrusting of the stamping device into contact with the object to be stamped, the stamping device would be caused to bounce back from the object for a time period before the trigger rod could activate the valve, the compressed air could traverse its tortuous route and the piston could travel down the cylinder striking the anvil and causing the type to strike the object. Such an initial striking of the object with the type and the bouncing back therefrom accompanied by the delay before the principal impact of the type therewith caused a double, skewed indentation on the object often rendering the marking illegible. In addition, such bouncing removed the stamping device from immediate proximity with the object thereby decreasing the effectiveness of the stamping because the type had a greater distance to travel and would not achieve its proper indentation depth.

One attempt to rectify certain of the shortcomings of the above-discussed prior stamping device included the provision of an air cylinder parallel to and connected by means of a keel-shaped bracket to the stamping device in order to mechanically move it into proximity with the object to be stamped rather than by means of the jib or track. However, such a configuration was frought with difficulties of its own. For example, due to the moment arm created in the keel-shaped bracket between the axis of the stamping device and that of the transport air cylinder, upon impact with the object, deflection would occur in the system thereby causing chatter and undesirably distorting the stamping indentation.

In an attempt to alleviate certain of the shortcomings of the prior stamping devices yet another device was developed. In that apparatus, the entire stamping device assembly was mounted into a hollow piston rod of a large diameter air cylinder. When the piston rod of the large air cylinder was extended, the stamping device would be brought into contact with the object. In the manner of the prior generation devices, the head of the stamping device would contact the object thereby displacing the head which would, in turn, displace the trigger rod. The displacement of the trigger rod would activate the valve means allowing air to enter the cylinder behind the piston after the compressed air traversed its complicated route to drive the piston into indirect contact with the stamping characters.

It has become apparent that problems still exist with stamping devices such as those most recently described. Due to the mechanical linkage between the trigger rod and the valve means, a certain time lag is present in such a device between the time of head contact with the object and the time of the stamping impact. Also, due to the design of the valve mechanism creating the tortuous route for the compressed air and its reliance on the trigger rod, additional delays are present. From above, such delays are problematic in that they have been found to cause chatter between the stamping type and the workpiece thereby destroying the stamping image. Further, such a system has grown overly complicated for its intended function and, hence, is difficult and costly to manufacture and to maintain.

The subject invention is directed toward an improved pneumatic stamping apparatus which overcomes, among others, the above-discussed problems and provides a cost-effecient pneumatic stamping apparatus which is effective to consistently produce a clear image on an article to be identifyingly stamped.

SUMMARY OF THE INVENTION

In accordance with the present invention, there is provided a pneumatic apparatus for accomplishing the identifying stamping of, for example, a steel billet. The stamping apparatus is provided adjacent, yet in spaced facing relation, to the article to be stamped. The stamping apparatus includes a cylindrical air cylinder housing having a double-acting hollow piston rod the piston of which is provided with an aperture therethrough. The piston rod also serves as the barrel for the longitudinal travel of an impact piston slidably disposed therein.

On the leading end of the piston rod there is provided a plunger mounted in a plunger housing which is slidably mounted in the free end of the piston rod. The plunger housing also supports an anvil member adjacent the end of the plunger and a type cartridge carrying the identifying type characters.

During operation, by the activation of a four-way valve, compressed air is injected into the trailing end of the air cylinder thereby extending the hollow piston rod toward the object to be stamped. However, due to the provision of compressed air of equal pressure on the leading end of the impact piston, the impact piston is maintained in its seated position covering the aperture in the end of the piston rod. When the type characters are brought into contact with the object to be stamped, the plunger housing is depressed relative to the piston rod thereby closing off the source of compressed air ahead of the impact piston and opening additional venting apertures in the barrel of the piston rod to the atmosphere. Due to the extension of the piston rod there is provided a reservoir of compressed air behind the impact piston but no pressure is maintained ahead of it which causes the impact piston to be propelled down the barrel to strike the plunger almost immediately after the type characters meet the object and depress the plunger housing. The impact of the impact piston with the plunger causes the plunger to strike the anvil which, in turn, causes the anvil to strike the type characters thereby imparting identifying character indentations into the object.

As soon as the operating valve is reversed to its original position, compressed air is injected ahead of the piston of the piston rod thereby retracting it and removing the type and the plunger housing from contact with the object. Upon retraction of the piston rod, springs provided intermediate the piston rod and the plunger housing cause the plunger housing to be extended thereby closing off the vents to the atmosphere and reopening the source of compressed air ahead of the impact piston. This action causes the impact piston to be returned down the barrel to its seated position at the end of the piston rod.

Accordingly, the present invention provides solutions to the aforementioned problems in the identification stamping process. Due to its unique design providing a reservoir of compressed air and eliminating virtually all flow restrictions, the instant apparatus provides an almost immediate striking of the type characters by the impact piston upon the engagement of the stamping apparatus with the object. In addition, the invention provided herein is able to generate greater impact force by the impact piston than that of previous apparatuses, and such increased force is available even without a complete extension of the position rod.

These and other details, objects and advantages of the invention will become apparent as the present preferred embodiment thereof proceeds.

BRIEF DESCRIPTION OF THE DRAWINGS

In the accompanying drawings, I have shown a present preferred embodiment of the invention wherein.

DETAILED DESCRIPTION OF THE PREFERRED EMBODIMENTS

Figures 1, 2, 3:
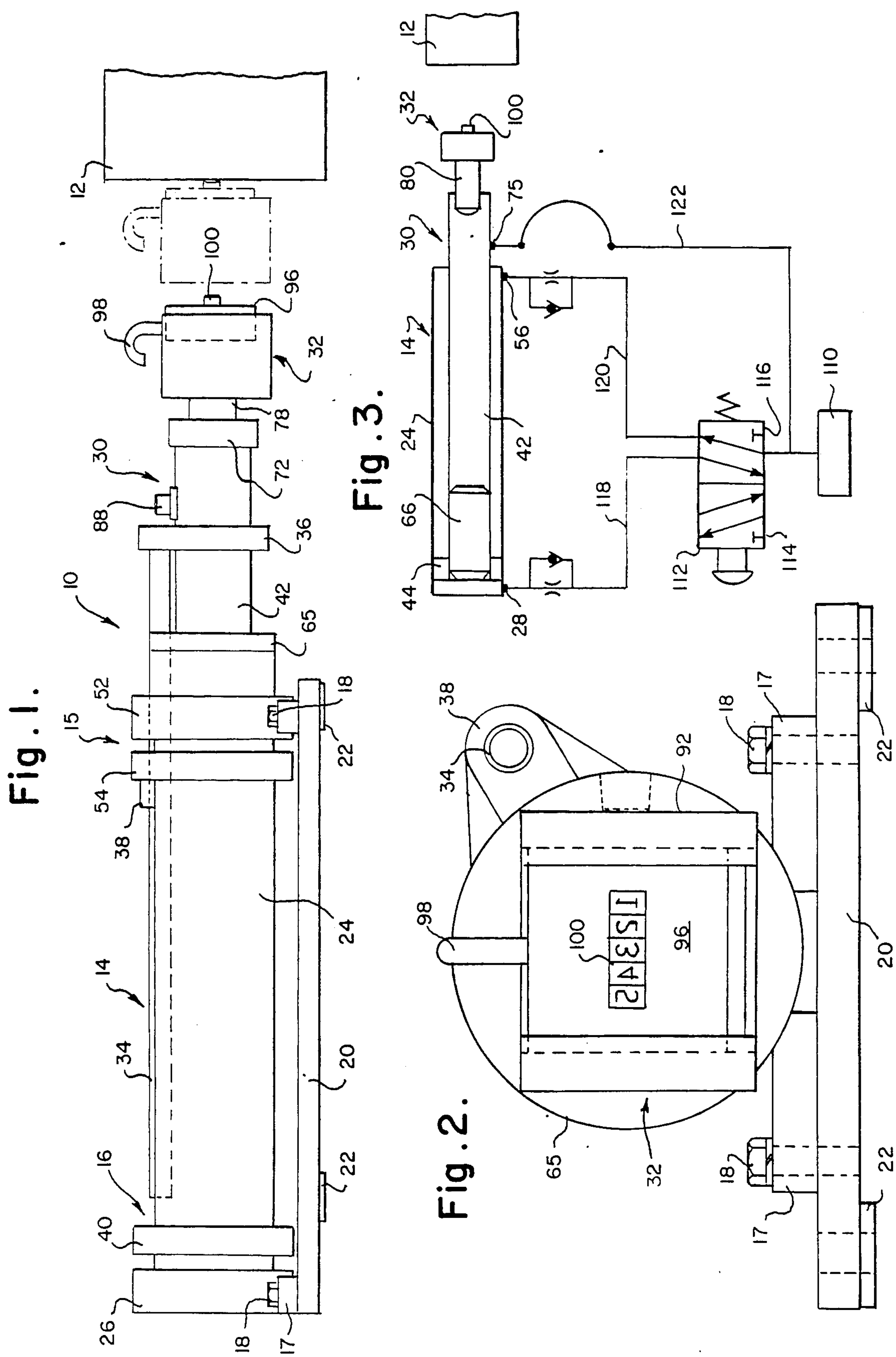
FIG. 1 is a side elevation view of the stamping apparatus provided herein.
FIG. 2 is an end elevation view of the present stamping apparatus.
FIG. 3 is a schematic drawing of a control mechanism for the present invention.
Figure 4A:
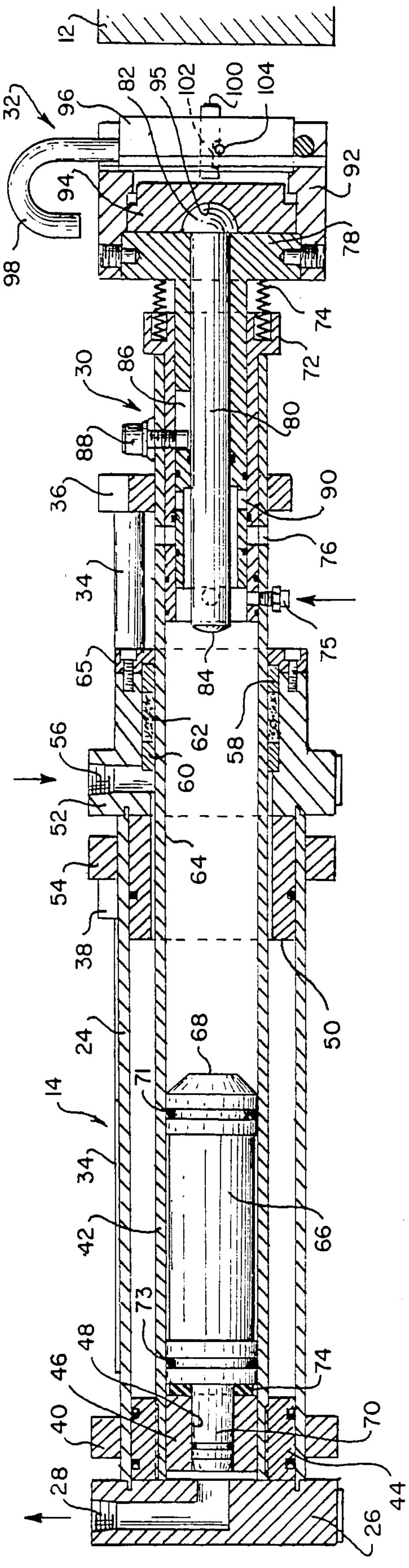
FIG. 4*a* is a side sectional elevation view of the instant apparatus in the position immediately after energization of the operating valve.
Figure 4B:
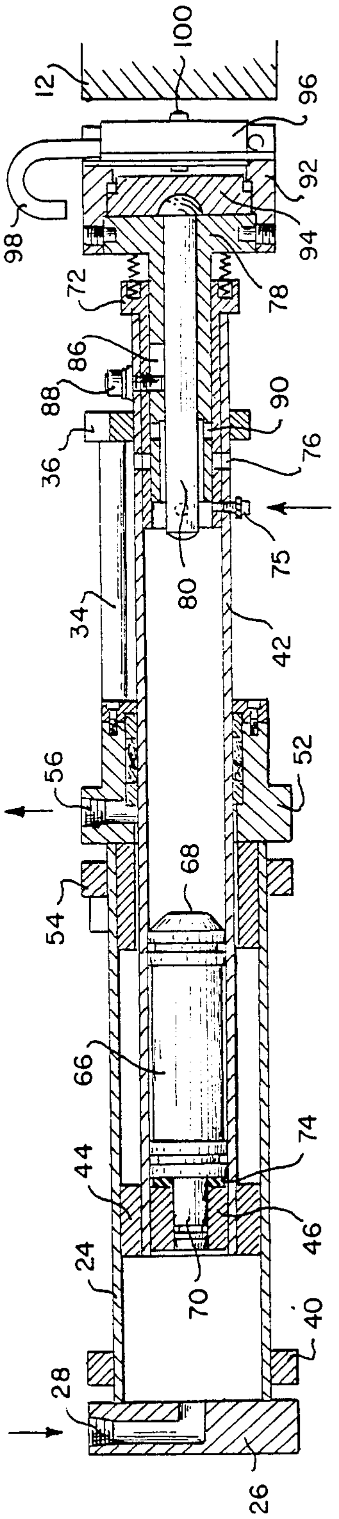
FIG. 4*b* is a side sectional elevation view of the present apparatus after partial extension of the piston rod.
Figure 4C:
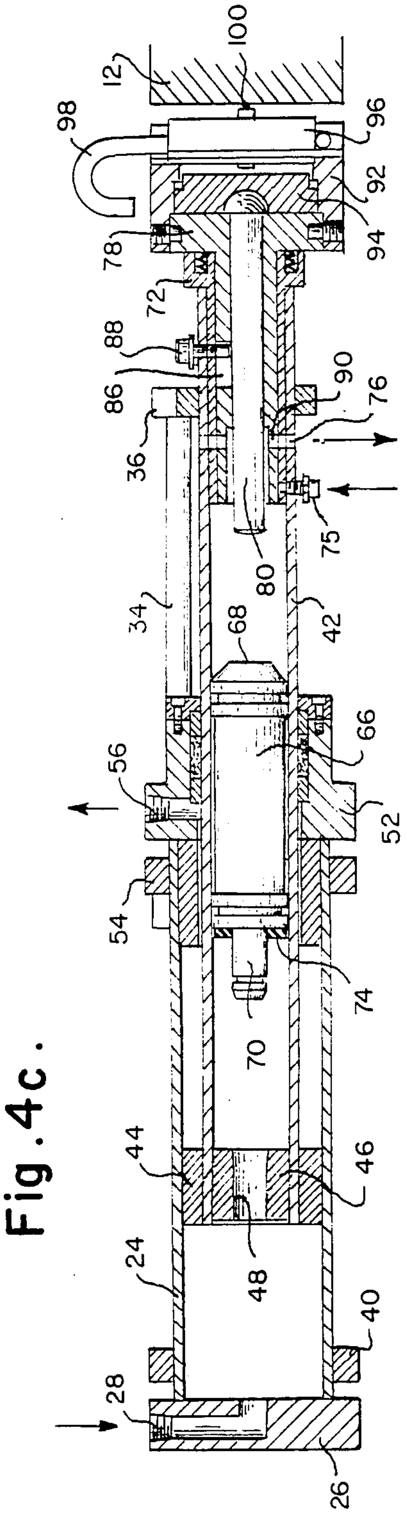
FIG. 4*c* is a side sectional elevation view of the instant invention with the type characters contacting the object to be stamped.
Figure 4D:
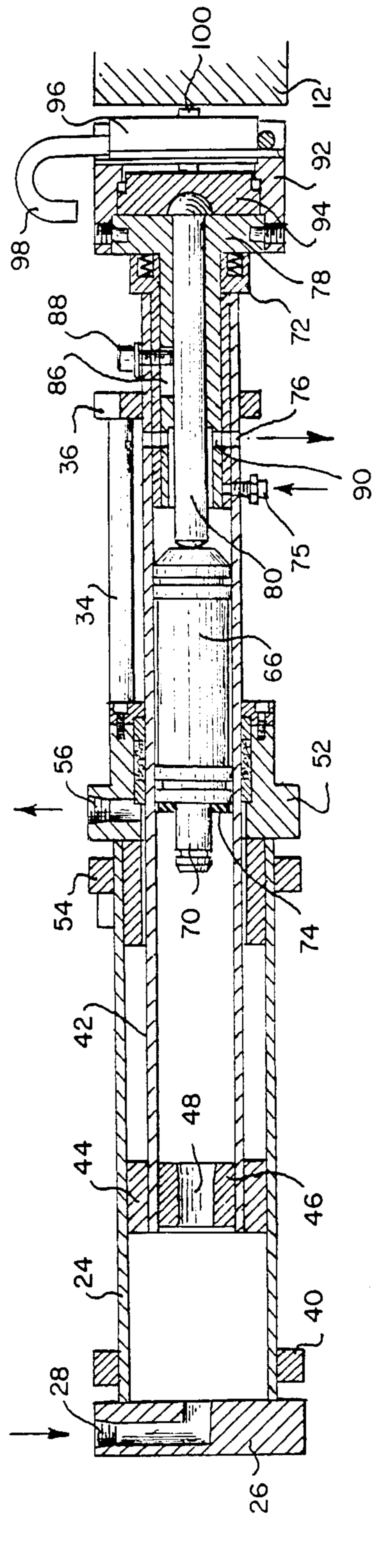
FIG. 4*d* is a side sectional elevation view of the apparatus according to the present invention shown with the impact piston striking the plunger.
Figure 4E:
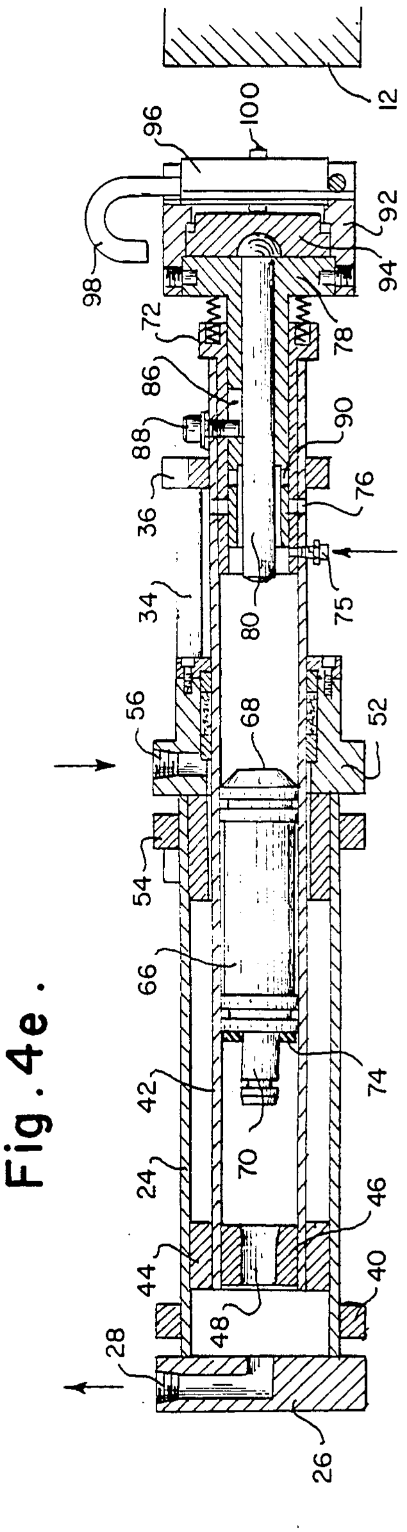
FIG. 4*e* is a side sectional elevation view of the present invention with the plunger housing reextended and with the impact piston being returned to its ready position.

Referring now to the drawings wherein the showings are for purposes of illustrating the present preferred embodiment of the invention only and not for purposes of limiting the same, the figures show a pneumatic stamping apparatus, generally designated as 10, for stamping a workpiece 12 with indenting identifying information. Workpiece 12 may, by means of example only, consist of a hot or cold metallic object, such as a billet, bloom or slab, a wooden post or any other article to be stamped with indenting identifying characters.

More particularly and with reference to FIG. 1, there is shown stamping apparatus 10 including a double acting air cylinder, generally designated as 14, having a leading end 15 and a trailing end 16 as well as extended legs 17 for mounting by means of bolts 18 on a plate 20 having feet 22. Air cylinder 14 includes a metallic cylinder 24 and a trailing end cap 26 which is provided with a passageway 28 to allow the admission of compressed air into cylinder 24. Slidably disposed coaxially within air cylinder 14 is a piston rod, generally 30, having a stamping head 32 affixed to the foremost end thereof. An elongated guide rod 34 is secured to the leading end of piston rod 30 by means of collar clamp 36 and is supported on air cylinder 14 by means of linear bearing 38 to serve as a torque reactor to assure the nonrotation of piston rod 30 during its extension and retraction.

In particular, cylinder 24 is affixed to end cap 26 by means of bolts (not shown) passing between it and flange 40 which is affixed to cylinder 24. The piston rod 30 actually consists of a cylindrical rod 42 in combination with a piston 44 which fills the annular area between cylindrical rod 42 and the inner circumference of cylinder 24. Plug 46 having a cylindrical aperture 48 is secured to the inner circumference of the trailing end of cylindrical rod 42. Air cylinder 14 is also provided with an annular cylindrical head 50 within the leading end 15 of cylinder 24 so as to surround the cylindrical rod 42. A leading end cap 52 is secured to the leading end rod 15 of cylinder housing 24 by means of bolts (not shown) which cooperate with a flange 54 thereon. An air port 56 is provided in leading end cap 52 in order that when compressed air is injected into air port 56, the piston 44 of piston rod 30 will be forced toward the trailing end 16 of cylinder 24. Front bearing 58 and rear bearing 60 cooperate with piston 44 to support cylindrical rod 42 within cylinder 24 while packing 62 seals the leading end of cylinder 24 in order that the piston rod 30 may be retracted. A face plate 65 is provided on the foremost end of air cylinder 14.

The inner circumference of the cylindrical rod 42 of piston rod 30 forms a barrel 64 within which there is provided an impact piston 66. Impact piston 66 consists of a solid cylindrical body having a leading face 68 and a tail portion 70 which serves, when impact piston 66 is maintained in its retracted position adjacent plug 46 to seal cylindrical aperture 48 from air flow. Seals 71 and 73 are provided at the leading and trailing ends of impact piston 66, respectively, and protection pad 74 is provided around tail portion 70.

Affixed to the inner circumference of the leading end of rod 42 is a spring housing 72 from which extend compression springs 74. An air port 75 and venting apertures 76 are provided to pass through spring housing 72 and through rod 42. Slidably received within the inner circumference of spring housing 72 is a plunger housing 78 which is movable between extended and retracted positions and which receivably supports a plunger 80 having a rounded leading head 82 and a trailing end 84. Plunger housing 78 includes a slot 86 formed therein which is intended to cooperate with a dog point screw 88 to limit the travel of plunger housing 78 within spring housing 72. Also, apertures 90 are provided in plunger housing 78 to match up with apertures 76 when the plunger housing 78 is in its retracted position. The housing 92 of stamping head 32 is supported by means of plunger housing 78. Movably supported within housing 92 is an anvil 94 which includes a rounded-in-area 95 intended to receive the rounded head 82 of plunger 80. Stamping housing 92 also receives a type cartridge 96 having a handle 98 and which supports type characters 100. Type characters 100 include a notched area 102 which serve to cooperate with pin 104 to align and retain the type characters within type cartridge 96.

The controls for the stamping apparatus 10 are shown in FIG. 3. The admission of compressed air from a source 110 to apparatus 10 is controlled in part by means of four-way valve 112 which is movable to cause source 110 to communicte with either section 114 having one flow path or section 116 having another air flow path. Selection of the first section 114 of four-way valve 112 causes the connection of compressed air from source 110 to air port 28 behind the piston 44 of piston rod 30 by means of line 118, and second valve section 116 causes connection to air port 56 by means of line 120 ahead of the piston 44. Compressed air source 110 is directly connected to air port 75 ahead of impact cylinder 66 by means of air line 122.

The operation of stamping apparatus 10 may be diagramatically illustrated by reference to FIGS. 4*a* through 4*e*. When four-way valve 112 is in the second position in which the source of compressed air 110 is connected via section 116 to line 120 and line 118 is vented to the atmosphere, compressed air is forced into air port 56 thereby retracting piston 44 of piston rod 30 toward trailing end cap 28. Also, as the compressed air source 110 is connected to line 122 and air port 76 is not blocked by plunger housing 78, compressed air is provided into air port 75 thereby filling the barrel 64 of cylindrical rod 42 ahead of impact cylinder 66 and forcing it into its seated position adjacent plug 48. Due to the action of springs 74, stamping head 32 remains extended.

When four-way valve 112 is moved into the first position in which the source of compressed air 110 is connected to line 118 and line 120 is vented to the atmosphere, compressed air is injected into port 28 and directly behind piston 44 of piston rod 30. Such injection of compressed air causes piston 44 to be moved toward the leading end 15 of cylinder 24 thereby extending piston rod 30, and hence, stamping head 32 toward the workpiece 12. It must be noted that during the above procedures compressed air is continuously injected into barrel 64 ahead of impact piston 66 through air port 75 which remains free from obstruction by plunger housing 78. Despite the fact that compressed air is attempting to urge the impact piston 66 away from plug 46, due to the equal air pressures being applied to the leading face 68 and to the tail 70 of impact piston 66 and since the area of leading face 68 is substantially greater than that of the end of the tail 70, impact piston 66 remains seated on aperture 48 of plug 46 during extension of piston rod 30. In addition, during this phase of the operations stamping head 32 remains extended relative to piston rod 30.

As soon as the type characters 100 meet the workpiece 12 thereby halting the movement of stamping head 32, the next phase of operations is initiated. The type characters 100 will be automatically aligned along work piece 12 due to the movement of their notches 102 along pin 104. Piston rod 30 continues to be extended relative to the stamping head 32 for a brief period when the movement of stamping head 32 is impeded by workpiece 10 until spring housing 72 meets plunger housing 78. This movement causes the cylindrical portion of plunger housing 78 to close air port 75 from the source of compressed air 110 while simultaneously aligning apertures 90 in the plunger housing with venting apertures 76 which pass through the spring housing and air cylinder 24, respectively, thereby opening the barrel 64 to the atmosphere. Due to the reservoir of compressed air stored in cylinder 24 between trailing end cap 26 and piston 44, compressed air is available immediately and without restriction to drive impact piston 66 along barrel 64 and toward plunger 80.

The progress of impact cylinder 66 along barrel 64 is abruptly halted when the leading face 68 of impact piston 66 strikes the trailing face 84 of plunger 80. Such impact causes the rounded surface 82 of plunger 80 to be driven against rounded-in surface 95 of anvil 94 thereby causing anvil 94 to impact type characters 100 which leave identifying identations in workpiece 12. All components of stamping apparatus 10 will remain in this position until four-way valve 112 is reversed.

When four-way valve 112 is moved from its first position in which section 114 is in fluid communication with line 118 to its second position in which section 116 is in fluid communication with line 120, compressed air is introduced into leading air port 56. Such injection of compressed air into leading air port 56 causes compressed air to enter cylinder 24 ahead of piston 44 thereby retracting piston rod 30 relative to workpiece 12. As soon as piston rod 30 and, hence, spring housing 72 have retracted a short amount, which amount is controlled by the cooperation of the dog point screw 88 with the slot 86 in plunger housing 78, venting apertures 76 and apertures 90 in the plunger housing 78 are moved from alignment and the obstruction of plunger housing 78 of air port 75 is removed. This allows compressed air to enter barrel 64 ahead of impact piston 66 thereby causing it to be retracted into seating relation with plug 46, but to not impact it with too much force due to protecting pad 74, while due to the injection of compressed air into air port 56, piston 44 is caused to be retracted into seating relation with end cap 26. Hence, the systems of stamping apparatus 10 are ready for another stamping cycle.

As such, due to the advanced design of the present invention the stamping impact of the impact piston 66 with the plunger 80 occurs almost instantaneously upon the contact of the type characters 100 with workpiece 12 due to the reservoir of compressed air as described above. This rapid deployment of impact piston 66 is important in that it enables a distortionfree image to be created on workpiece 12. Further, it will be appreciated that due to the present design, the full velocity of impact piston 66 is not dependent on the extending movement of piston rod 30. That is, due to the present design impact piston 66 will be caused to achieve its maximum velocity regardless of whether piston rod 30 is fully extended.

It will be understood that various changes in the details, materials and arrangements of parts which have been herein described and illustrated in order to explain the nature of the invention may be made by those skilled in the art within the principle and scope of the invention as expressed in the appended claims.

What is claimed is:

1. Apparatus for stamping a workpiece comprising:

a pneumatic cylinder defining a cylindrical chamber having a leading end closest to said workpiece and a trailing end;

a cylindrical piston rod having a leading end and a trailing end disposed coaxially within said cylindrical chamber and having a piston secured to the trailing end thereof, said piston rod being displaceable between a retracted position in which the trailing end of said piston rod is adjacent said trailing end of said cylindrical chamber and an extending position in which the trailing end of said piston rod is remote from said trailing end of said cylindrical chamber, the inner surface of said piston rod defining a cylindrical barrel;

means for applying fluid under pressure to said chamber either to the area between said trailing end of said chamber and said trailing end of said piston rod or to the area between the leading end of said chamber and the leading end of said piston rod and for releasing the fluid pressure in such areas;

an impact piston slidably disposed within and of similar cross-sectional shape to said barrel, said impact piston having a leading end and a trailing end;

means for applying fluid under pressure either to the area between the trailing end of said barrel and the trailing end of said impact piston or to the area between the leading end of said barrel and the leading end of said impact piston and for releasing the fluid pressure in such areas so as to, respectively, either propel said impact piston between a position at the trailing end of said barrel and a position at the leading end of said barrel or to move said impact piston between said position at the leading end of said barrel to said position at said trailing end of said barrel;

a stamp means movably supported by the leading end of said piston rod and having a stamping face and also having a portion disposed within said barrel whereby when said piston rod is in its extended position said stamping face is disposed adjacent to said workpiece and such that when said impact piston is propelled to the position at the leading end of the barrel it is caused to contact said portion of said stamp means, said contact being effective to cause said stamping face to indentingly contact said workpiece.

2. Apparatus of claim 1 in which said stamp means comprises:

a plunger having a leading end and a trailing end such that its trailing end comprises said portion of said stamp means;

a plunger housing supported by the leading end of said piston rod, said plunger housing slidably supporting said plunger and having a leading end and a trailing end;

a stamping head supported by said plunger housing adjacent to said leading end of said plunger;

stamping characters having a trailing end and a working end in facing relation to said workpiece, said working end comprising said stamping face, said stamping characters being movably supported by said stamping head adjacent said leading end of said plunger.

3. Apparatus of claim 2 further comprising an anvil movably supported by said stamping head between said leading end of said plunger and said trailing end of said stamping characters.

4. Apparatus of claim 3 in which said plunger housing is slidable relative to said piston rod between an extended and a retracted position.

5. Apparatus of claim 4 further comprising a first venting aperture in said plunger housing near the trailing end thereof.

6. Apparatus of claim 5 further comprising:

a cylindrical plug provided within the trailing end of said piston of said piston rod, said cylindrical plug being provided with a cylindrical aperture therethrough said aperture allowing fluid communication between said chamber and said barrel;

a tail portion extending from the trailing portion of said impact piston such that when said impact piston is in said position at the trailing end of said barrel, said tail is in sealing engagement with said aperture.

7. Apparatus of claim 6 further comprising:

an input port through the wall of said piston rod near the leading end thereof, such that a fluid under pressure may be admitted through said input port into said barrel between the leading end thereof and the leading end of said impact piston; and, a second venting aperture in said piston rod nearer to the leading end thereof than said input port such that when said plunger housing is in said retracted position said first venting aperture and said second venting aperture are aligned and said input port is covered by said plunger housing and such that when said plunger housing is in said extended position said input port is not covered by said piston housing and no part of said first and said second venting apertures are in alignment.

* * * * *